A. A. BUSH AND R. H. FREITAG.
MACHINE FOR ENGRAVING MOLDS.
APPLICATION FILED OCT. 18, 1919.
1,385,333.
Patented July 19, 1921.
6 SHEETS—SHEET 1.
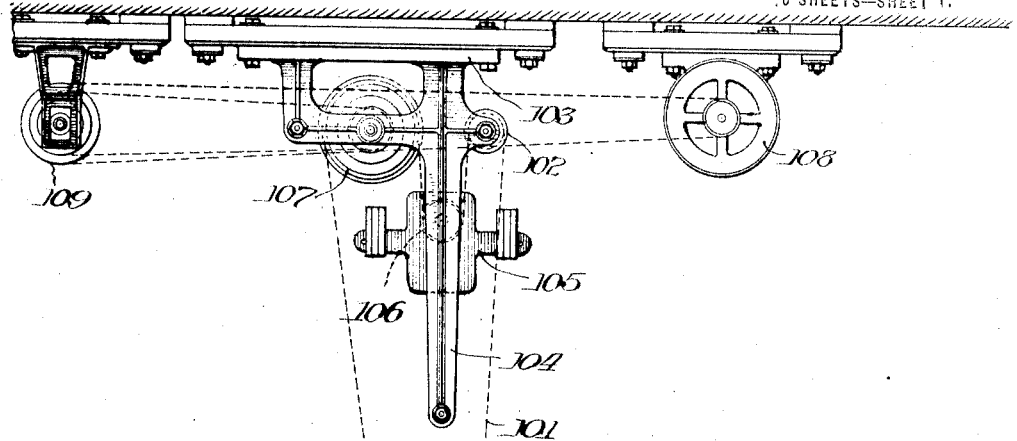
*Fig. 1*
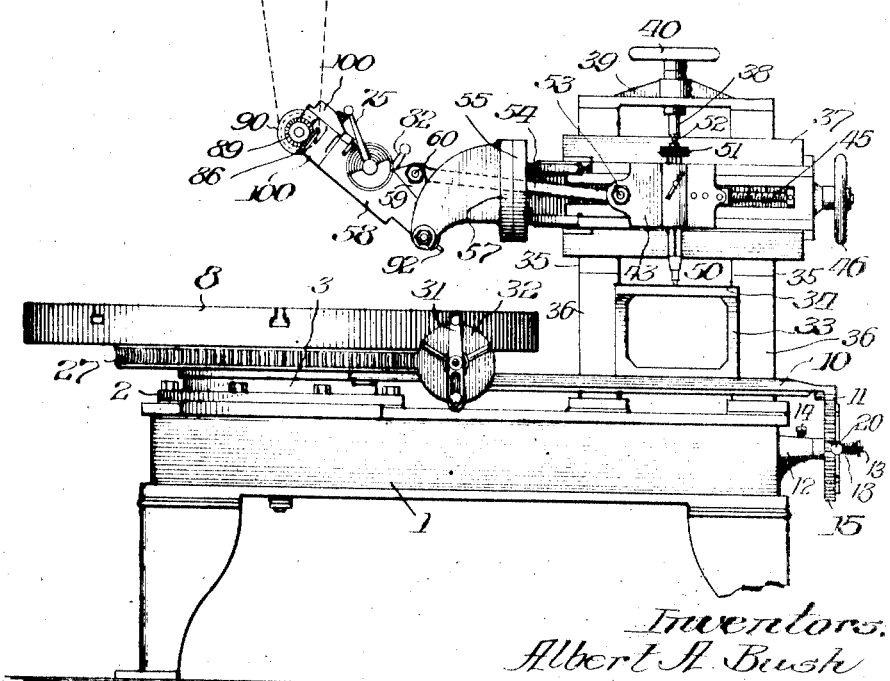
Witness:
Inventors.
Albert A. Bush
Richard H. Freitag

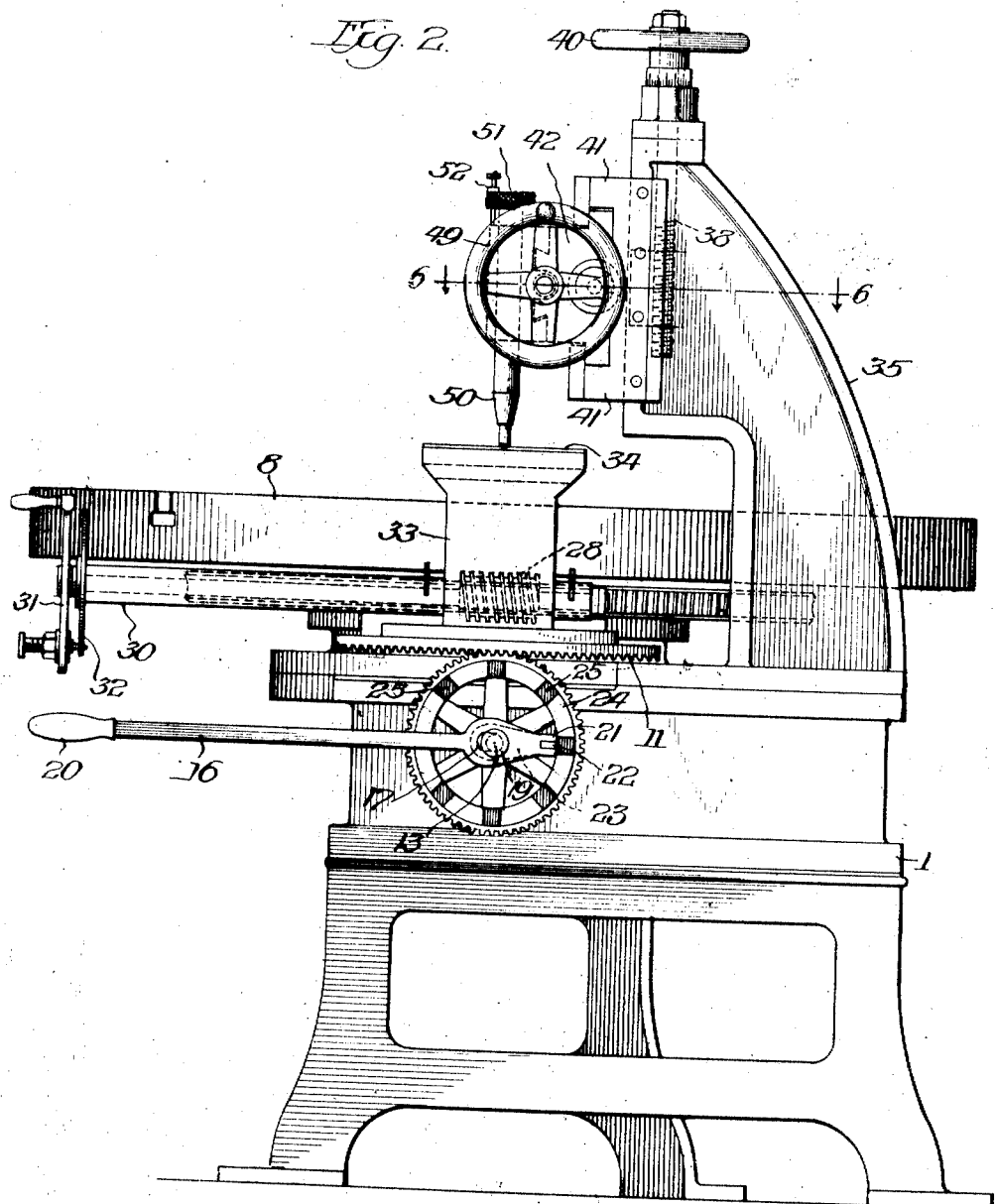

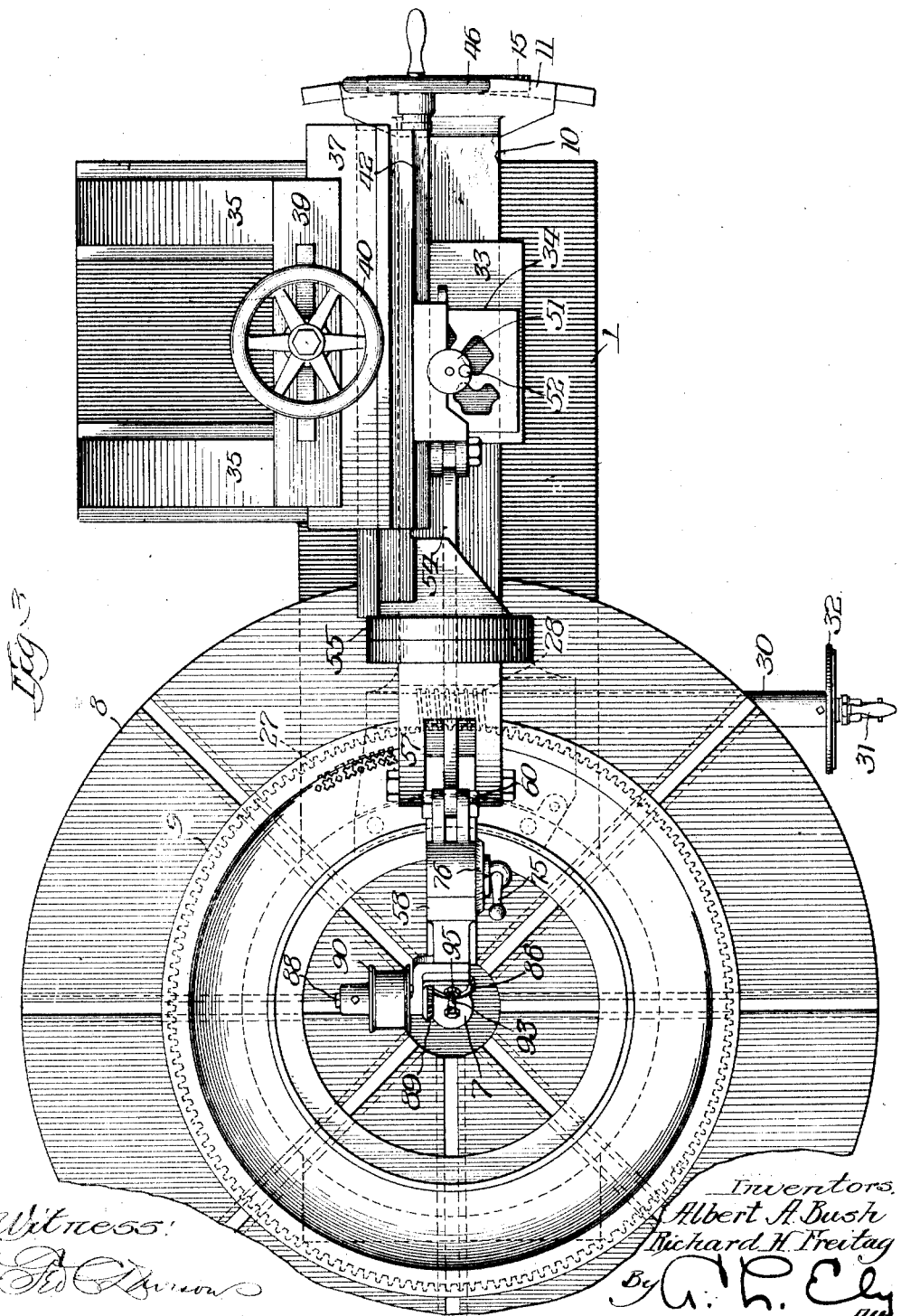

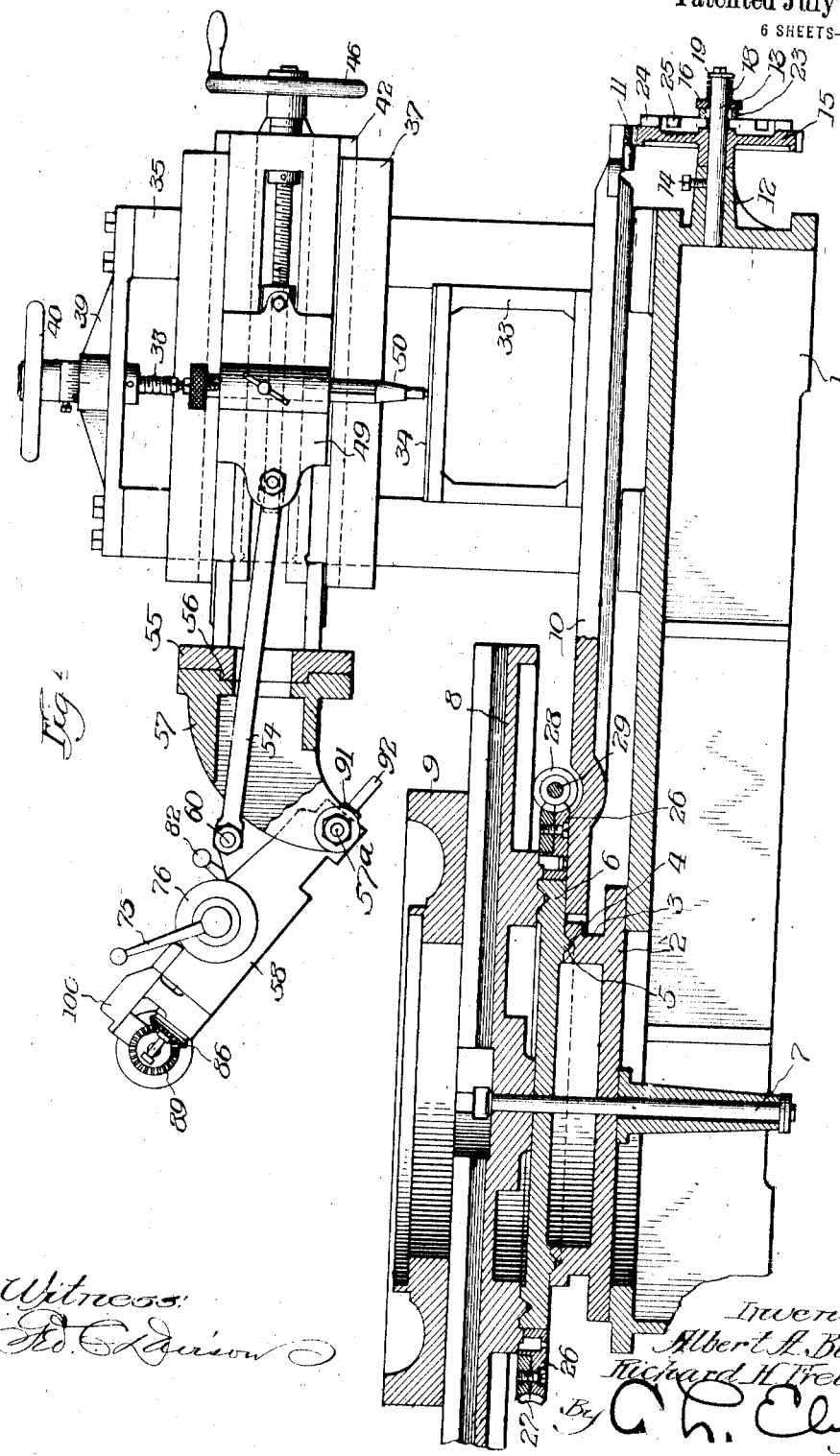

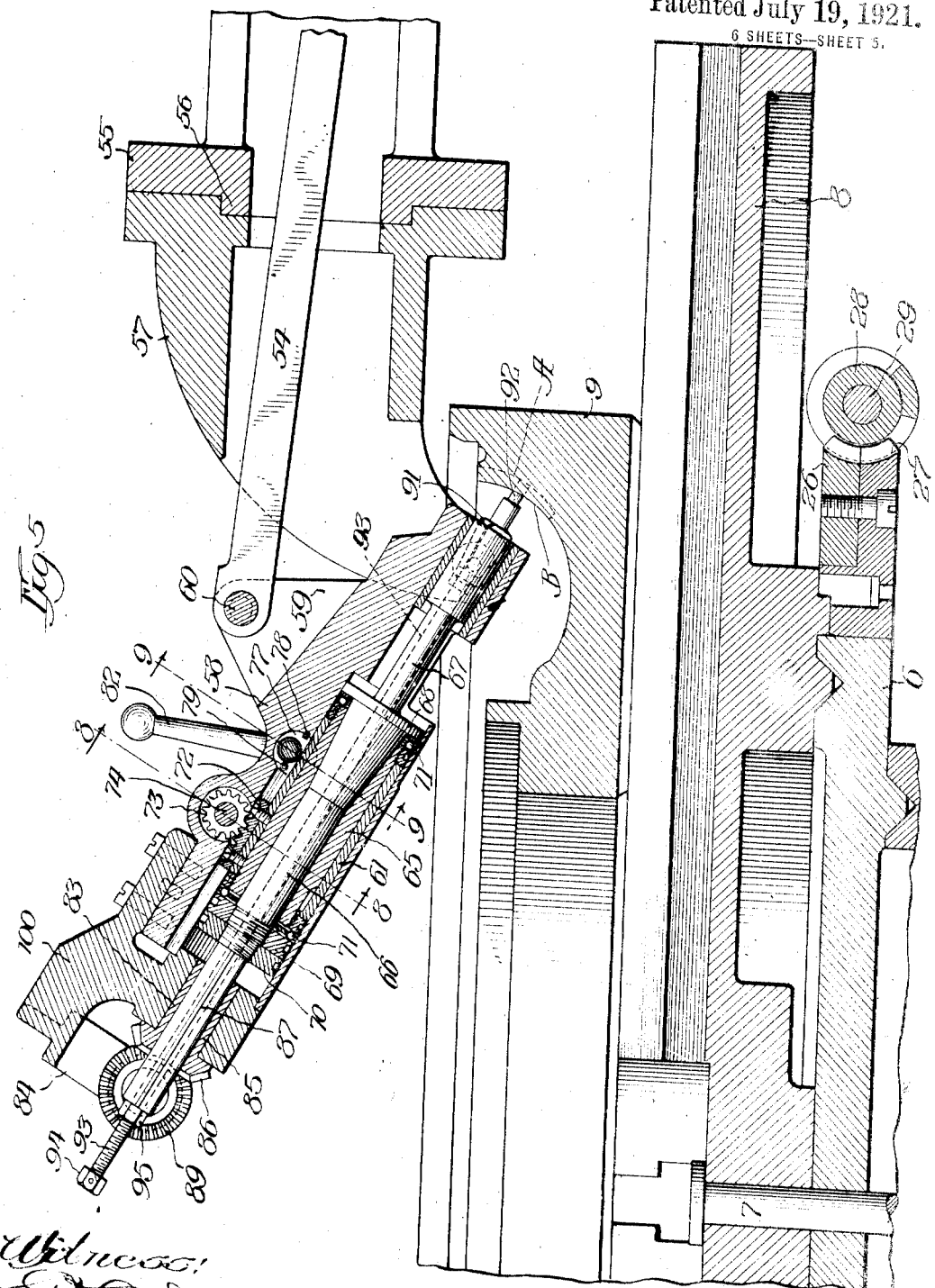

A. A. BUSH AND R. H. FREITAG.
MACHINE FOR ENGRAVING MOLDS.
APPLICATION FILED OCT. 18, 1919.
1,385,333.
Patented July 19, 1921.
6 SHEETS—SHEET 6.
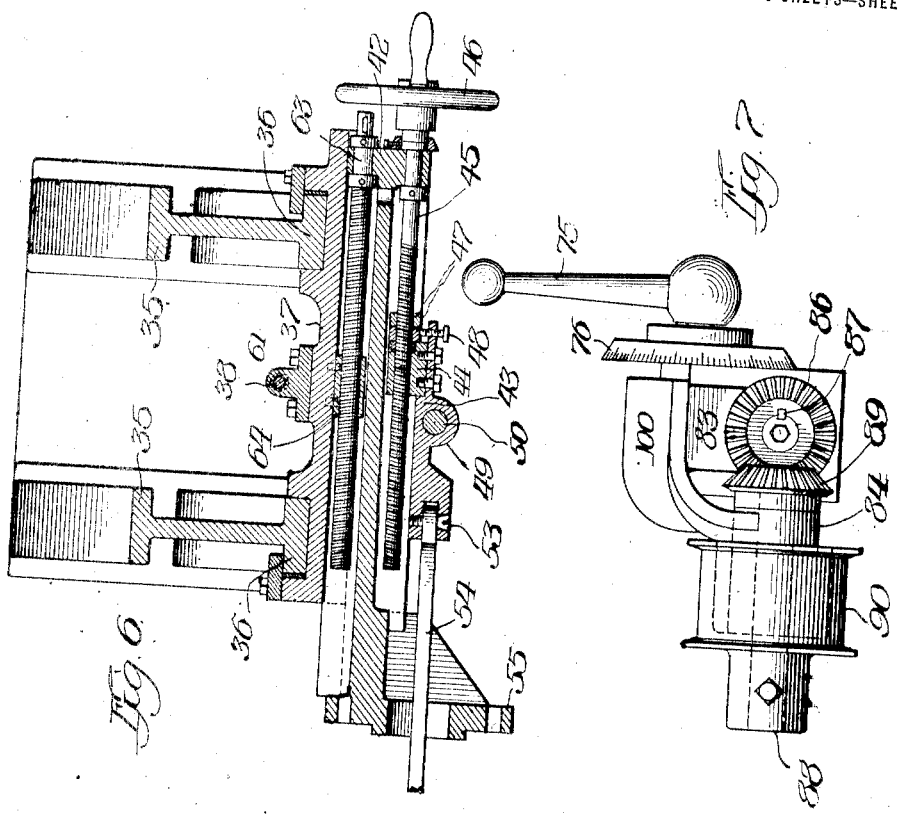
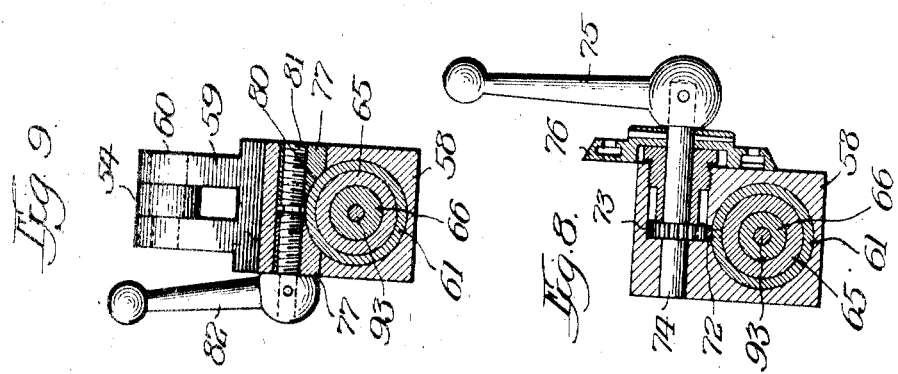
Witness:
Fd. Dawson.
Inventors:
Albert A. Bush
Richard H. Freitag
By G. L. Ely Atty.

UNITED STATES PATENT OFFICE.

ALBERT A. BUSH AND RICHARD H. FREITAG, OF AKRON, OHIO, ASSIGNORS TO THE FIRESTONE TIRE AND RUBBER COMPANY, OF AKRON, OHIO, A CORPORATION OF OHIO.

MACHINE FOR ENGRAVING MOLDS.

1,385,333.  Specification of Letters Patent.  Patented July 19, 1921.

Application filed October 18, 1919. Serial No. 331,663.

*To all whom it may concern:*

Be it known that we, ALBERT A. BUSH and RICHARD H. FREITAG, citizens of the United States, residing at Akron, in the county of Summit, State of Ohio, have invented certain new and useful Improvements in Machines for Engraving Molds, of which the following is a specification.

This invention relates to a machine for the purpose of engraving designs on molds in which tires are vulcanized. The designs are engraved on the outer rounding surface of the mold halves and are for the purpose of giving the tread of the tire the rough or non-skid features. The cutting of the designs in tire molds has hitherto presented a great many difficulties and has been a slow and tedious process, but by the machine shown herein the time of cutting is greatly reduced and the work is done more accurately than by methods previously in use, and the most intricate patterns may be easily reproduced in the mold.

It will be understood that the showing and description of the mold engraving machine as embodied in this application is for the purposes of disclosure of the invention only, and is not in any sense limiting, as the invention is susceptible of embodiment in many different forms, such forms being included in this invention.

In the drawings:

Figure 1 is a front elevation of the mold engraving machine.

Fig. 2 is a side elevation.

Fig. 3 is a plan view.

Fig. 4 is an enlarged front elevation of the major portion of the machine showing the cutting head raised out of the operative position.

Fig. 5 is an enlarged section through the head and table showing the tool in cutting position.

Fig. 6 is a horizontal section through the cutter supporting carriage.

Fig. 7 is an end view of the cutting or milling head.

Fig. 8 is a section on the line 8—8, Fig. 5.

Fig. 9 is a section on the line 9—9, Fig. 5.

The machine comprises a table or base upon which is rotatably mounted a mold carrying turn table, and also a vertical guideway for sustaining a carriage which in turn supports a head in which is rotated a tool shaft, the lower end of which supports a cutting or milling tool. The cutting head and mold supporting table are so arranged and constructed that, by the aid of a pattern or pantograph the milling or cutting tool can be accurately guided over the surface of the mold to cut the pattern therein.

In the drawings 1 represents the base or platform which supports the operative parts of the machine. At one side of the base plate 1 is secured a bearing plate 2, the upper surface of which is provided with a circular rib or flange 3, the top being formed with a V-shaped groove 4. Into the groove 4 is received a corresponding shaped rib 5 projecting from the lower side of an intermediate bearing plate 6, this bearing plate being movable about a center rod 7 projecting upward through the table.

Above the plate 6 and mounted in the same manner so as to be movable thereon about the center rod 7 is a mold supporting table or platform 8, having any suitable means provided for clamping a mold 9 centrally thereon.

In the machine herein shown there are two mechanisms by which the mold may be moved about the center 7, one being for the purpose of following the pattern or pantograph, to be later described, and the other for setting the mold forward to engrave a new unit. The first means for moving the table, that is for following the outline of a single unit or figure, which is to be repeated over the mold, is embodied in a long operating arm indicated by the numeral 10, which arm is secured to the underside of the bearing plate 6 and extends across the length of the base plate 1, the end of the arm projecting over the side of the table and having secured thereto a gear segment 11. On the base plate 1 below the end of the arm is formed a bearing 12 in which is received a shaft 13, held by a set screw 14. On the end of this shaft is supported a gear wheel 15, which is so arranged as to mesh with the gear segment 11, when the mold supporting table is set in its operative position as shown in Fig. 3. On the end of the shaft 13 is loosely mounted an operating lever 16, being provided with a slot 17 which passes over the end of the shaft, and being pressed toward the gear by a spring 18 surrounding the shaft and held in place by a washer or plate 19. One end of the lever is extended to provide a handle 20, and the other end is formed with forks 21 to which is pivotally connected an ear 22 of a lever fulcrum plate 23 which passes over the shaft 13. The outer face of the gear is formed with a rib or flange 24, in the surface of which is a series of notches 25 into any one of which the shank of the lever may be received.

In the operation of the parts described, when it is desired to move the mold about its center to cut the desired pattern, the operator raises or lowers the lever 16 which in turn moves the operating arm 10 to and fro about the center pin 7. To allow a greater extent of movement, the lever 16 may be moved outwardly, pivoting at 22, and another notch 25 engaged by the shank thereof.

In all tire mold designs there is a constant repetition of a single unit or sector and the pattern or pantograph used in this machine is designed to include one unit. When a unit has been completely engraved, the mold is turned about its center to bring a new area under the milling tool. In order to accomplish this purpose the mold supporting platform 8 is provided with means for rotating it on the intermediate bearing plate 6. To the underside of the plate 8 and surrounding the plate 6 is a gear ring 26, the outer face of which is provided with a two part worm gear 27, meshing with a worm 28 on a shaft 29. The last named shaft is received in a sleeve 30 which extends laterally from the arm 10 and projects beyond the table 8, the shaft being provided with an operating crank 31. The end of the sleeve 30 carries a disk 32 which may be graduated in any well-known manner to provide for accurate setting of the mold. Any suitable means for locking the platform may be provided.

On the operating arm 10 is carried a table 33 to the upper face of which is secured the pattern, templet or pantograph 34 which is cut out in such shape as to generate one of the units of the design desired to be reproduced in the mold.

From the rear of the bed plate rises a pair of standards 35, the upper ends of which overhang the operating arm 10. The front faces of these standards are formed as rails 36 on which is slidably mounted a vertically moving carriage 37, the same being held in any position of vertical adjustment by a screw shaft 38 supported at its upper end in a bridge piece 39 across the standards, and provided with a hand wheel 40. On the face of the carriage 37 is formed a pair of guideways 41 in which is horizontally slidable a second carriage 42. In the rear of this carriage is arranged a longitudinal screw shaft 63 which engages with a nut 64 secured to the slide 37, by means of which an initial adjustment of the carriage 42 may be obtained. On the face of the carriage 42 are formed dove-tail guide rails in which is received a shiftable tool guiding slide or stylus carrier 43, the rear face of which is provided with a nut 44, threaded on an operating shaft 45 rotatably mounted in the carriage 42 and provided with a crank wheel 46. To prevent any lost motion between the tool guiding slide and the screw there is provided a pair of lock nuts 47, one of which is contacted by a set screw 48.

Through a boss 49 in the slide 43 is slidably mounted a pin 50, the lower end of which may be provided with a roller, which is received in the templet or pattern 34. The pin 50 may be termed a stylus or templet follower and is guided about the pattern as will appear. The head 51 of the stylus is provided with an eccentrically arranged set screw 52 which bears on the carriage and by which the depth is adjusted.

The end of the carriage or stylus carrier 43, remote from the screw, carries a pin or pivot 53 on which is mounted a link 54 which serves to rock the milling head. The end of the intermediate slide 42 toward the table is provided with a bearing 55 having a centrally arranged boss 56 over which is fitted a head 57, the end of which is curved downwardly and serves as a fulcrum for the milling tool carrier indicated generally by the numeral 58. The link 54 extends through the hollow portion of the fulcrum head 57 and is pivotally connected to lugs 59 by a pin 60.

The fulcrum 57ª of the milling tool head or carrier is so arranged that it can be adjusted in position to be at the center of curvature of the outer surface of the tread of the tire (see Line A, Fig. 5). The milling tool head is arranged with a longitudinal bore in which is slidably mounted a bushing 61. Interiorly of the bushing is received a sleeve 65 in which is rotatably mounted the central portion 66 of a spindle 67.

Below the sleeve 65 the spindle is provided with a flange 68 and above with two lock nuts 69 and 70. Between the lock nuts and the flange and the sleeve 65 are arranged ball bearings 71.

On the upper side of the bushing is secured a short rack 72 which meshes with a pinion 73, located centrally of a shaft 74 rotatably mounted in the milling cutter head 58. The shaft 74 is provided with a handle 75 by which it may be rotated to adjust the depth of the milling tool. A calibrated disk 76 may be secured to the shaft 74.

In order to lock the milling tool spindle in any desired adjustment, there is mounted in the head 58 below the rack and pinion a pair of sliding pins or dogs 77 which are prevented from turning by a key 78, and may be constantly urged apart by a coil spring indicated at 79 in Fig. 5. The lower inner ends of the pins are formed with arc shaped faces 80 which are designed to closely fit the outer surface of the bushing 61, and the pins are adapted to be moved together to clamp the bushing in place by an oppositely screw-threaded bolt 81, eccentrically located with respect to the pins. The bolt is adapted to be rotated by a handle 82, by means of which the bushing may be locked in place at the desired point of adjustment.

The outer end of the milling head carries a bracket 100 having a bearing 83 surrounding the spindle 66 and a second bearing 84 arranged at right angles thereto. In the bearing 83 is arranged the sleeve 85 of a bevel pinion 86, having a feather connection with the spindle as shown at 87. In the bearing 84 is arranged a driving shaft 88 having a bevel pinion 89 in mesh with the pinion 86 and a pulley 90 by which it may be driven, thus rotating the spindle 66.

In the lower end of the spindle 66 is located a spring collet 91 designed to hold the milling or engraving tool 92, the collet being arranged to be operated by a long bolt 93 extending the length of the spindle. The upper end of the bolt is provided with a head 94 by which it may be turned, and with a lock nut 95 which bears against the upper end of the spindle.

It will have been evident that a flexible driving means is necessary for the spindle 66 as it is moved by the link 54 guided by the templet follower. Any suitable means may be provided, but in the specific embodiment herein shown, use is made of a belt 101 passing over the pulley 90 on the tool head and over an idler 102 mounted in a bracket 103 secured to the ceiling. The bracket is provided with a pair of parallel guideways 104 in which is slidably mounted a weighted frame 105 which carries a belt-tightening pulley 106 around which the belt passes. In the bracket is also mounted a pulley 107 driven in any suitable manner, here shown as a motor 108 and an intermediate pulley 109. As the outer end of the head is raised, the slack in the belt is taken up by the sliding pulley 106.

The operation will be easily understood from the description which has preceded. The mold is centrally clamped on the platform 8, and the desired templet or pattern on the table 33. The vertically moving carriage 37 and the horizontally moving carriage 42 are now adjusted to bring the fulcrum of the milling tool head in the center of curvature of the line A. The pin 50 is brought within the pattern or templet and the tool revolved by the belt 101 while it is guided by causing the pin 50 to follow the templet. This is accomplished by manipulation of the handle 46 by which the oscillation of the tool is governed, and by operation of the handle 16, whereby the mold is moved to cause the relative circumferential travel of the tool. The depth of the tool is regulated by the handle 75 and when the proper depth is reached, the tool is locked by manipulation of the handle 82.

When a single unit represented by the design on the templet, and corresponding to a given sector of the mold, has been cut, the tool is withdrawn and a new sector of the mold brought into the range of the tool by manipulation of the handle 31, the sectors being accurately spaced apart by use of the measuring disk 32.

When it is desired to round off the outer edges of the engraving along the line B of Fig. 5, in order to form a fillet at the bottom of the figures on the tire, the head is moved back so that the fulcrum is at the center of curvature of the line B, a larger pattern inserted in place of the original pattern, and a new tool inserted to cut a rounding edge on the figure. By means of this adjustment the hand work required in cutting the mold is greatly reduced.

Changes and modifications may be made in the exact form shown and we are not limited to such form, but may include in this invention many equivalents which fall within the scope of the appended claims.

We claim:

1. In a machine for the purpose set forth, the combination of a tire mold carrier, a cutting tool carrier, said elements being independently movable so that the tool may reach any part of the mold surface to be cut, a pattern for a section of the mold, a pattern follower, the mold carrier being connected to one of said parts, the tool carrier to the other, and independent means to move the tool carrier relatively to the mold to present a new section of the mold to the tool so that the design may be repeated on the mold.

2. In a machine for the purpose set forth, the combination of a rotating tire mold carrier, an oscillating tool carrier pivoted at the center of transverse curvature of the mold, a pattern and a pattern follower, and means connecting the mold carrier to one of said parts and the tool carrier to the other.

3. In a machine for cutting designs in tire molds, the combination of a pivoted supporting arm, a mold carrier on the one end of said arm, a pivoted cutting head above the mold, means for rocking said head about its fulcrum to cause it to move transversely of the mold, a pattern, and a pattern follower located at the other end of said arm, and means to rock said arm to cause the follower to trace the pattern.

4. In a machine for cutting designs in tire molds, the combination of a pivoted supporting arm, a mold carrier rotatably mounted on one end of said arm, a pivoted cutting head above the mold, means for rocking said head about its fulcrum to cause it to move transversely of the mold, a pattern and a pattern follower located at the other end of said arm, means to rock said arm to cause the follower to trace the pattern, and means to rotate the mold on the end of the arm.

5. In a machine for cutting designs in a curved tire mold, the combination of a pivoted arm, a mold carrier on the end of said arm, a pattern carrier on the other end of said arm, a stylus, a pivoted cutting head, connections from the stylus to the cutting head, means to move the stylus about the pattern, and means to rock the arm about its pivot.

6. In a machine for cutting repetitions of designs in a curved tire mold, the combination of a pivotally mounted mold table, the mold being secured to said table concentrically therewith, an arm connected with said table for moving the same about its pivot, a pivoted cutting head over the mold, a pattern and a pattern follower, one of said parts being connected to said cutting head and the other to the arm, and means independent of said arm for moving the table about its pivot to present a new section of the mold to the cutter.

7. In a machine for cutting designs in a curved tire mold, the combination of a pivoted arm, a mold carrier located concentrically with respect to the pivot of said arm, a pattern secured to the arm, a movable stylus carrier over the pattern, and a pivoted cutting head over the mold and a link connecting the stylus carrier to the head.

8. In a machine for cutting designs in a curved tire mold, the combination of a pivoted arm, a mold carrier located concentrically with respect to the pivot of said arm, a pattern secured to the arm, a movable stylus carrier over the pattern, a pivoted cutting head over the mold, a link connecting the stylus carrier to the head, and means for rotating the mold carrier on the arm.

9. In a machine for engraving tire molds, a mold support, a vertically and horizontally movable carriage, an extension on said carriage adapted to be located over the mold, a cutting head pivoted in said extension over the mold, a rotating cutter in the head, means to oscillate said cutting head, a pattern and pattern follower by which the movement of said head may be controlled, and means to rotate the cutter during the oscillation of said head.

10. In a machine for engraving tire molds, a mold support, a vertically and horizontally movable carriage, an extension on said carriage adapted to be located over the mold, a cutting head pivoted in said extension, a rotating cutter in said head, a stylus carrier slidably mounted on said carriage, a link connecting said stylus carrier and said cutting head, and means to rotate the cutter during oscillation of said head.

11. In a machine for engraving tire molds, a mold support, a vertically and horizontally movable carriage, an extension on said carriage adapted to be located over the mold, a cutting head pivoted in said extension, a rotating cutter in said head, means to oscillate said cutting head, a pattern and pattern follower by which the movement of said head may be controlled, means to rotate the cutter during oscillation of the head, and means to shift the mold support about the center of the mold.

12. In a machine for engraving tire molds, a mold support, a vertically and horizontally movable carriage, an extension on said carriage adapted to be located over the mold, a cutting head pivoted in said extension, a rotating cutter in said head, means to oscillate said cutting head, a pattern and pattern follower by which the movement of said head may be controlled, means to rotate the cutter during oscillation of the head, and means to shift the mold support about the center of the mold, and separate means to rotate the mold support to advance the mold circumferentially with respect to the cutter.

13. In a machine for engraving tire molds, a mold support, an adjustable carriage, a cutting head pivoted on said carriage, the fulcrum of said head being adapted to be positioned at the center of curvature of the mold, a rotating cutter in said head, means to oscillate said head, a pattern follower connected to said head oscillating means, a mold support pivoted at the center of said mold, a pattern carrier on said support, and means to rotate the cutter during its oscillation.

14. In a machine for engraving tire molds, a mold support, an adjustable carriage, a cutting head pivoted on said carriage, the fulcrum of said head being adapted to be positioned at the center of curvature of the mold, a rotating cutter in said head, means to oscillate said head, a pattern follower connected to said head oscillating means, a mold support pivoted at the center of said mold, a pattern carrier on said support, means to rotate the cutter during its oscillation, and means to shift the mold on said support.

ALBERT A. BUSH.
RICHARD H. FREITAG.